Dec. 9, 1969   J. GIRAUD   3,482,400
TORQUE CONVERTER AND METHOD OF MANUFACTURE
Filed Jan. 12, 1968   5 Sheets-Sheet 1

INVENTOR
JACQUES GIRAUD
BY
McDougall, Hersh, Scott & Ladd
ATTYS

Dec. 9, 1969  J. GIRAUD  3,482,400
TORQUE CONVERTER AND METHOD OF MANUFACTURE
Filed Jan. 12, 1968  5 Sheets-Sheet 4

INVENTOR.
JACQUES GIRAUD
BY
M'Dougall, Hersh, Scott & Ladd
ATTYS.

United States Patent Office 3,482,400
Patented Dec. 9, 1969

3,482,400
TORQUE CONVERTER AND METHOD OF MANUFACTURE
Jacques Giraud, Saint-Germain-en-Laye, France, assignor to L'Aluminium Francais, Paris, France
Filed Jan. 12, 1968, Ser. No. 697,419
Claims priority, application France, Jan. 12, 1967, 90,879
Int. Cl. F16h *41/26*
U.S. Cl. 60—54                                                 5 Claims

ABSTRACT OF THE DISCLOSURE

A torque converter the parts of which are formed by shell casting under gravity or pressure, comprising the combination of:

(a) A drive rotor which includes a hub, an outer blade support fixed to the hub and shaped to correspond substantially to a semi-torus and blades interconnecting the hub and blade support with the inner ends located on an imaginary semi-torus;

(b) A driven rotor, which includes a hub, an inner support shaped to correspond substantially to a semi-torus and blades fixed between the hub and inner support with the outer ends located on a substantially semi-torus and with an open space between the blades of the driven rotor and the drive rotor;

(c) A reactor which includes a hub, an outer cylindrical support having an element conforming substantially to the semi-torus of the inner ends of the drive rotor blades and blades fixed between the hub and outer support and extending into said open space between the blades of the drive rotor and driven rotor;

(d) A sealed housing having an inner side in the shape of a semi-torus, and means fastening the housing to the drive rotor and means mounting the reactor for free rotational movement about the shafts of the drive and driven rotors and in which the parts are assembled with no other cross-grain parts.

---

This invention relates to torque converters and to a method for manufacturing such torque converters.

It is known that a torque converter is constructed with a sealed housing in which there is a conductive rotor solidly mounted on a motor shaft, a guided rotor connected to the driven shaft and a reactor formed of one or more paddle or turbine wheels mounted for free rotational movement between said rotors and the shaft of the latter.

In response to rotation of the conductor rotor, a fluid flows in the guided rotor by extertion of pressure which tends to turn the guided rotor in the direction of rotation of the motor. The relative speed of both rotors depends somewhat on the resistance applied to the motor shaft. The reactor changes the direction of the liquid flow as a function of the speed, thus increasing the amount of torque applied to the driven rotor. When the speeds of both rotors tend to become equal, the various movable parts of the converter have a tendency to rotate together so that the apparatus operates like a simple hydraulic coupling.

The apparatus operates with a certain slip of the driven rotor in relation to the drive rotor. This slip, with a corresponding loss of energy, is important at low speeds and even complete for slowing down the motor but diminishes quickly in proportion to the square of the angular speed of the driven rotor.

The converters heretofore employed are set up in the following manner:

The drive rotor comprises a hub solidly connected to an outer blade support substantially in the form of a semi-torus, an inner blade support which also has substantially the shape of a semi-torus and blades mounted between the two supports to make certain that the liquid is put in motion. These two semi-tori are cut along a plane perpendicular to the drive and driven shafts and which pass through the geometric site of the centers of the generatrix semi-circles of the semi-tori.

The driven rotor is substantially symmetrical with the drive rotor in relation to the plane defined above. The semi-tori are mounted opposite each other, so that the inner semi-tori on the one hand and the outer semi-tori on the other hand supplement each other so as to form two complete tori. However, the outer semi-torus is open in the portion located in the vicinity of the shaft.

The reactor is formed of a hub, an outer cylindrical support and blades fastened to the hub, on the one hand, and the outer support, on the other hand. The reactor is inserted into the free space between the two rotors in the area where the semi-tori are open as previously described.

Such torque converters are generally manufactured by two methods. In one method, each part is made by stamping and assembled with lugs. In the other method, each of the parts is made by molding. In accordance with the first method, each of the parts comprising blades or wings, the drive rotor, the driven rotor and the reactor have their bodies or hubs formed by stamping. The blades, obtained by die punching, are separately fixed with the aid of lugs onto the body or hub. A stamped inner semi-torus is then positioned on the drive and on the driven rotor by the same procedure. Similarly, a cylinder is placed about the periphery of the blade wheel of the reactor. The sealed housing is also stamped and attached to the drive rotor.

In accordance with the second method, each of the four parts is obtained by sand molding with cores. The mold construction is delicate because almost all parts comprise elements in counter-grain. Also, it is often preferred to relate the semi-tori of the drive rotor and of the driven rotor by fastening as by welding or riveting.

The first method has the inconvenience of requiring large stamping facilities and makes use of a laborious and time-consuming procedure for assembly. The second method is complicated because of the shape of the parts.

It is an object of this invention to produce and to provide a method for producing a torque converter which is simple in construction and of low cost.

These and other objects and advantages of this invention will hereinafter appear and for purposes of illustration, but not of limitation, embodiments of the invention are shown in the accompanying drawings in which—

Figure 1:
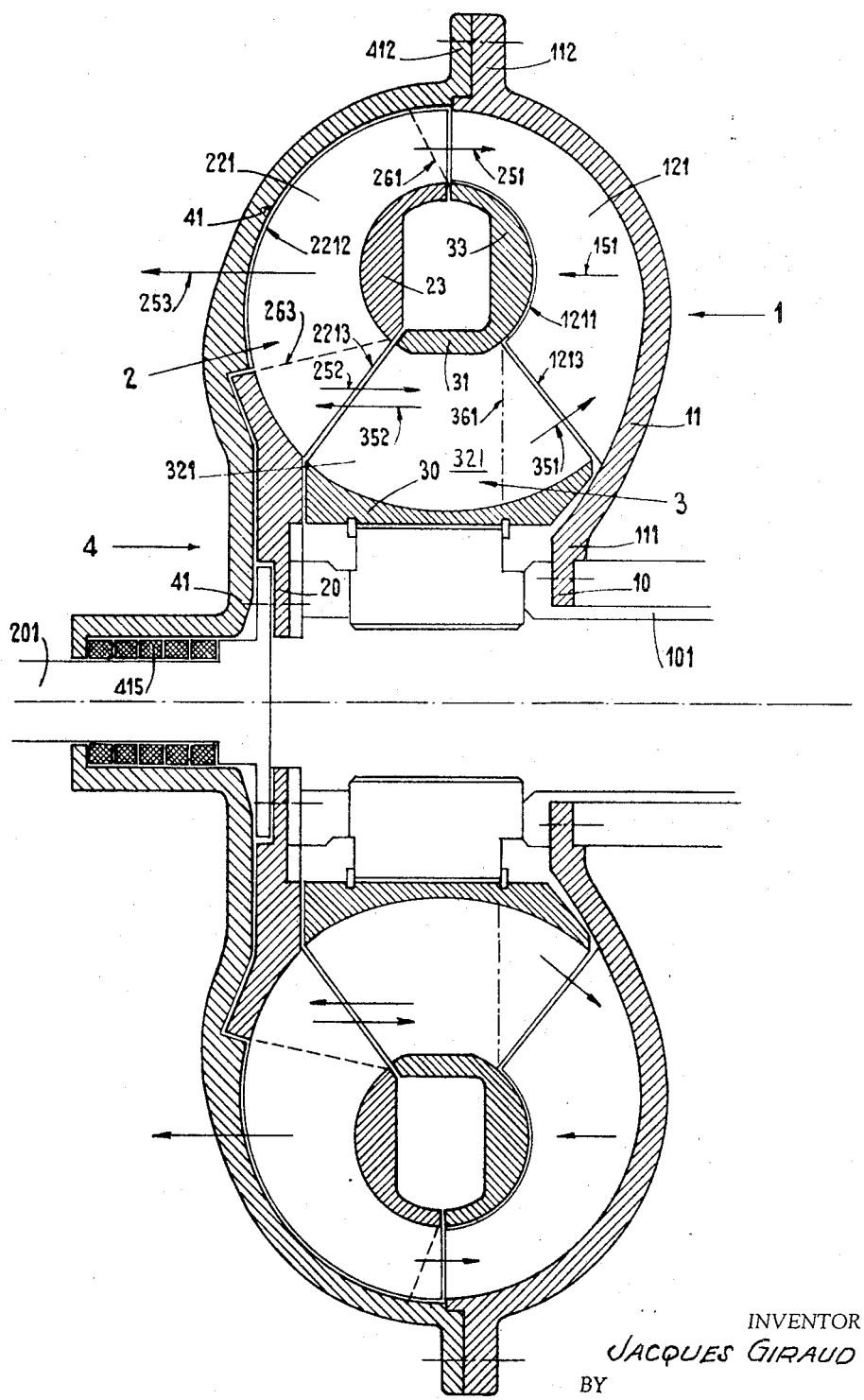
FIG. 1 is a sectional elevational view of a torque converter embodying the features of this invention.
Figure 2:
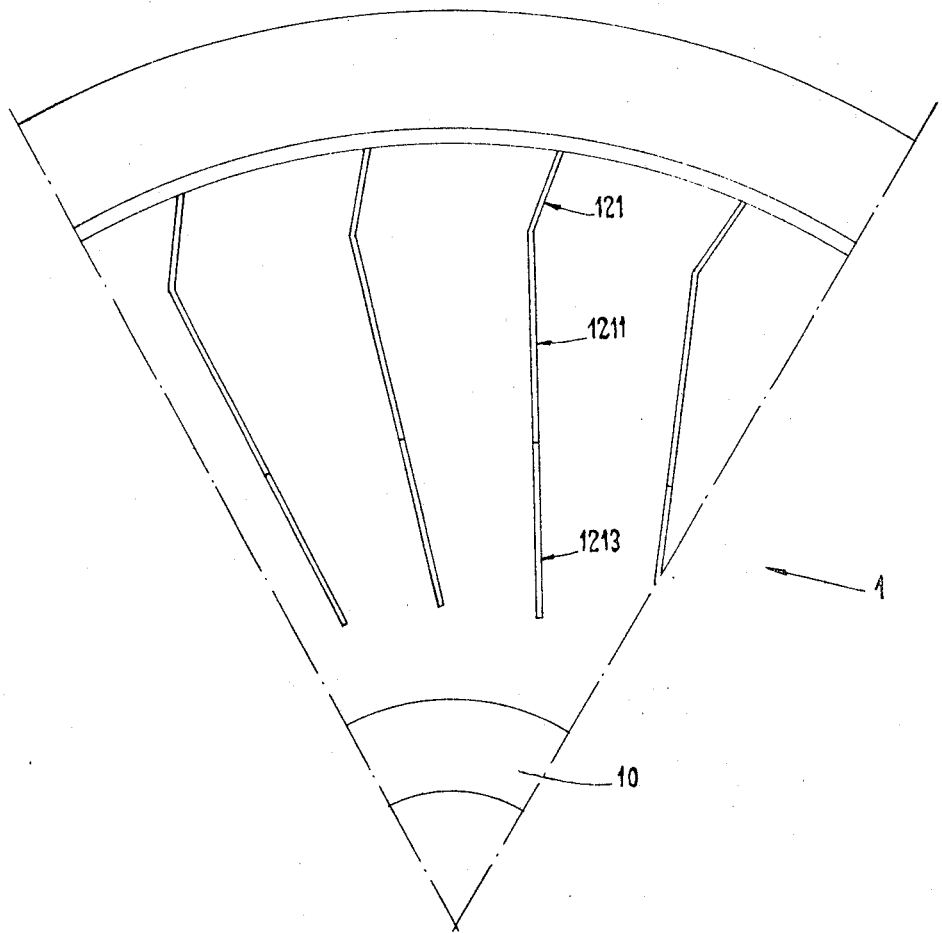
FIG. 2 is an elevational view in part of the drive rotor.
Figure 3:
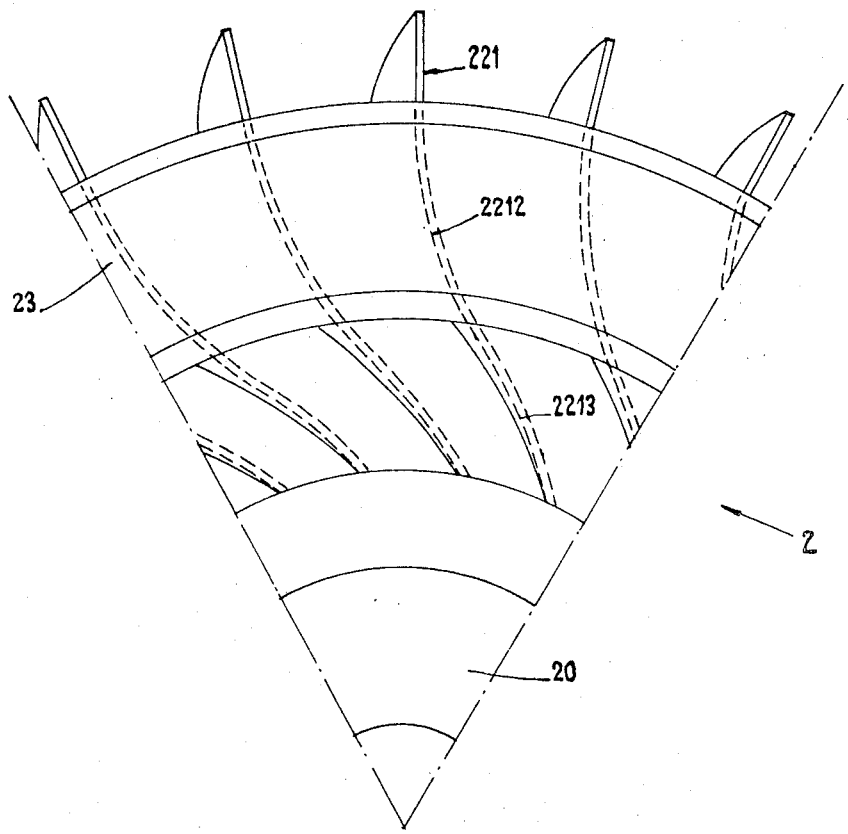
FIG. 3 is an elevational view in part of the driven rotor.
Figure 4:
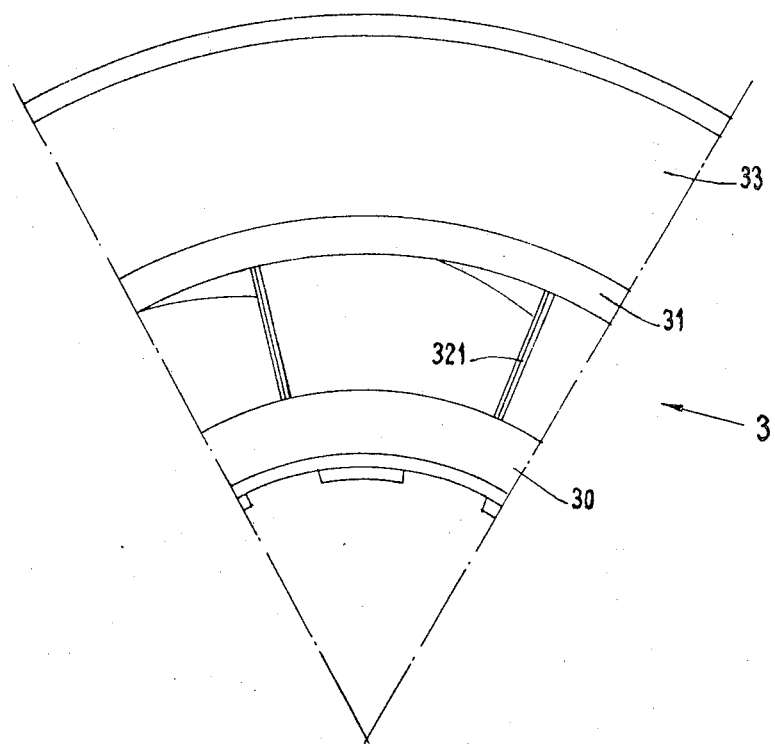
FIG. 4 is an elevational view in part of the reactor.

The torque converters of this invention comprise a drive rotor having a hub firmly connected to an outer blade support which is substantially in the shape of a semi-torus and blades carried by the support, in which the inner ends of the blades are located on a fictitious semi-torus; a driven rotor comprising a hub, an inner support having the shape substantially of a semi-torus and fixed blades attached at one end to the hub and at the other end to the inner support and with the outer ends of the blades placed on a semi-torus; a reactor comprising a hub, an outer cylindrical support provided with an element having substantially the shape of a semi-torus which corresponds as closely as possible to that containing the inner ends of the blades of the drive rotor and blades fixed at one end to the hub and on the other end to the outer cylindrical support; and finally a sealed housing having the shape of a semi-torus and attached to the drive rotor in order to form a tight housing containing the two other parts. The reactor is capable of free rotational movement about the joint axis of the shafts of both rotors and the blades of the reactor are located on the side of the shafts in an open area between the blades of both rotors.

In accordance with the practice of this invention each of the parts of the torque converter, including the sealed housing, the drive rotor, the driven rotor and the reactor, which have no other counter-grain part on either side of the joint planes, is shell-molded by gravity or under pressure.

The foregoing method applies independently of the material of which the torque converter is constructed, such as ordinary, alloyed or special castings; ordinary, alloyed or special steels, aluminum or magnesium based alloys, or plastics.

The torque converter has many uses such as in transportation, machine tools and drilling equipment. It is used only where its presently high cost is justified by the results obtained. It is the present high cost of such torque converters which has made it impractical for the converter to be employed in automotive vehicles.

The manufacturing method of this invention makes it possible materially to reduce the cost of equipment which should make available many new fields of application. The embodiment of this invention becomes possible by modification of the different parts making up the torque converter, the essential objective of which is the elimination of the cross-grain parts in relation to the joint surfaces of the parts thereby to make it possible to produce the parts by shell molding under gravity or pressure with the aid of shells of simple design.

The different parts making up the torque converter of this invention will now be described with reference to the accompanying drawings.

The drive rotor 1 comprises a hub 10 fixed to an outer support 11 which is substantially in the shape of a semi-torus. Blades 121 are secured to the interior of the support. The inner ends 1211 of the blades are contoured to define a fictitious or imaginary semi-torus. At their lower end, in the vicinity of the axis or shaft of the converter, the blades are truncated, as at 1213. The semi-torus which is formed by the outer support terminates at 111 to provide an opening in the central area for connection to the hub 10.

The driven rotor 2 comprises a hub 20, an inner support 23 having substantially the shape of a semi-torus. Blades 221 interconnect the inner support 23 with the outer hub 20 and are fixed on the one hand to the hub 20 and on the other hand on the inner support 23. The outer ends 2212 of the blades are located on a semi-torus. The blades 221 are truncated as at 2213, at their end near the axis of the converter.

The reactor 3 comprises a hub 30, an outer cylindrical support 31 provided with an element 33 having substantially the shape of a semi-torus. Wings or blades 321, joining the support 31 and the hub 30, are fixed on the one hand to the hub 30 and on the other hand to the outer cylindrical support 31. The reactor is mounted so that it can rotate freely about the shaft of the converter. Its blades 321 are wedged between the blades 121 of the drive rotor and the blades 221 of the driven rotor in the open space between their truncated ends 1213 and 2213.

The sealed housing 4 is shaped on the inside as a semi-torus 41 which corresponds as nearly as possible to the torus defined by the outer ends 2212 of the blades of the driven rotor 2. The housing has a crown or upwardly extending flange 412 secured to a corresponding crown 112 on the periphery of the outer support 11. It thus constitutes an extension of the drive rotor so as to form therewith a tight or sealed housing containing the other two elements. The hub 10 of the drive rotor is keyed or otherwise fixedly connected to a motor shaft 101 while the hub 20 of the driven rotor is connected for rotation with a driven shaft 201. Both shafts can be axially aligned, in which event a housing 4 is provided with a sealing gasket 415. The shafts may also be arranged concentrically with the drive shaft in the form of a tubular member having the driven shaft concentrically arranged therein for rotational movement. The two shafts may thus extend from the same side of the drive rotor so that the housing 4 need no longer be formed with a passage for the shaft.

According to the embodiment shown in FIG. 1, the semi-torus on which the outer ends 2212 of the blades 221 of the driven rotor are located is imaginary. The element 33 of the outer cylindrical support 31 of the reactor 3 has the shape of a semi-torus which corresponds as closely as possible to the imaginary semi-torus containing the inner ends 2212 of the wings 221.

Figure 5:
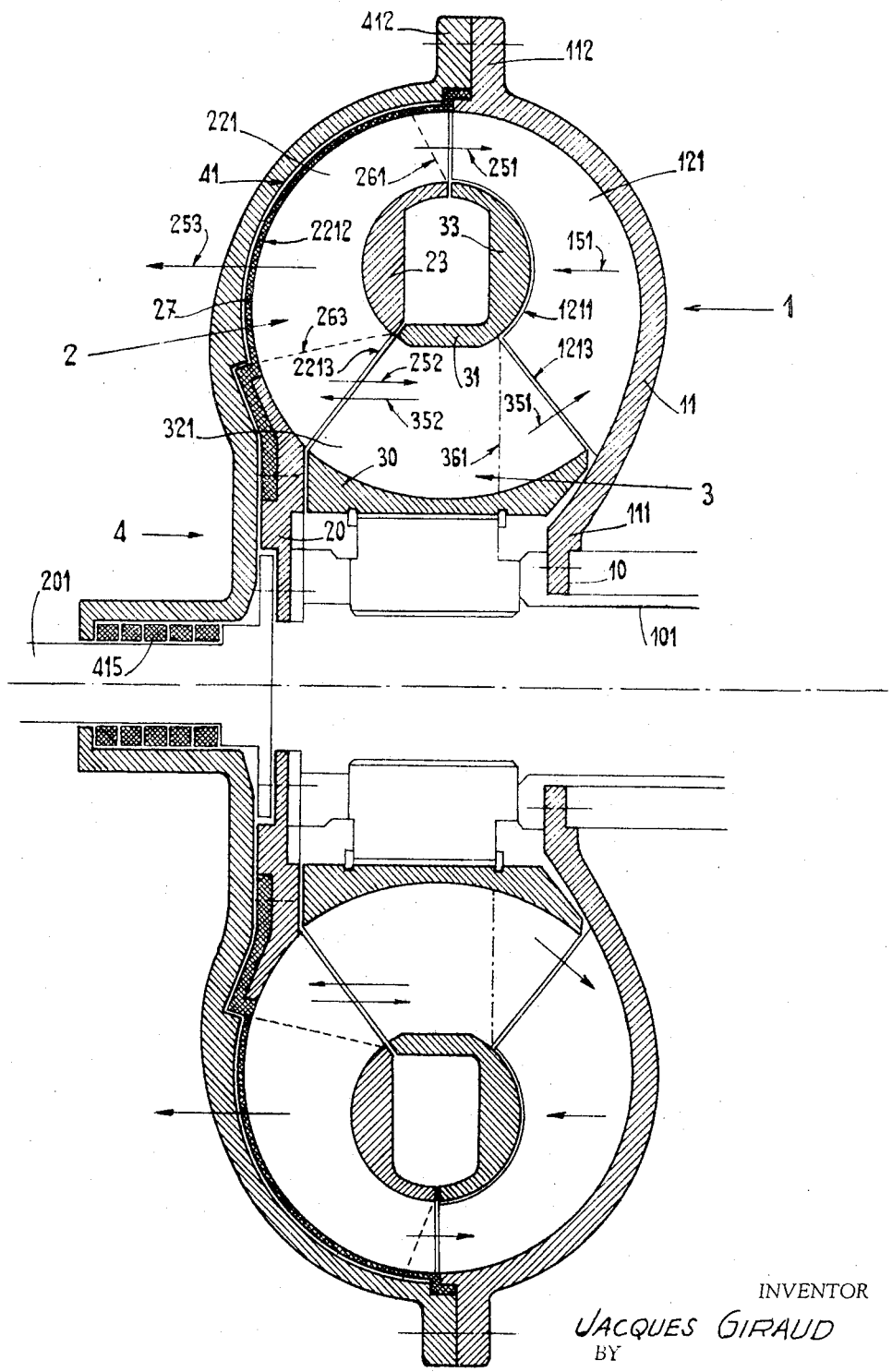
FIG. 5 is a sectional elevational view similar to that of FIG. 1 showing a modification in the torque converter.

According to the improved converter shown in FIG. 5, the semi-torus on which the outer ends 2212 of the blades 221 are located is formed with a side plate 27 attached to the inner support 23. The adjacent inner side 41 of the sealed housing 4 is then formed of a semi-torus closely and narrowly conforming to the shape of the outer side of the side plate 27.

This side plate, fixedly connected to the drive rotor 2, makes it possible to minimize hydraulic leaks and losses which otherwise can exist between the inner support 23 and the inner side 41 of the sealed housing 4. This arrangement results in an increase in the output of the apparatus.

The new design of the parts of the torque converter makes it possible to manufacture the parts directly by shell molding using gravity or pressure. The four or five parts of which the apparatus is formed include no counter-grain parts on the one hand and no other joined surfaces on the other hand.

The shell molding method can be employed for part production without reference to the material used such as ordinary mechanical, alloyed, or special castings; ordinary, alloyed or special steels, aluminum or magnesium base moldings, or synthetic resinous or plastic materials.

The precision parts produced by the shell molding process makes it possible to obtain elements which can be mounted with a minimum amount of machining. The cost of the converter is then reduced by as much as half by comparison with the described methods and materials employed by the prior art in which the labor savings are derived from the cost of the parts and their assembly.

The drive rotor 1 has one open direction of graining toward the inner end 1211 of the blades 121 along the arrow 151.

The driven rotor 2 has three graining directions, the first one being indicated by arrow 251 for the portions of the blades located outside of the trunk of the cone 261, the second being shown by arrow 252 for the blade portions located inside the truncated cone 263, and the third is indicated by the arrow 253 for the portion of the blades located outside the truncated cone 261 and outside the truncated cone 263.

The reactor has a graining direction open in the direction of the arrow 351 for the part located in relation to the plane created by the straight line 361 on the same side as the drive rotor 1 and in the direction of the arrow 352 for the other part of the arrow.

The housing 4 has a graining direction open towards the inside of the converter.

It will be apparent from the foregoing that I have provided a new and improved torque converter and a simple and more efficient method for the preparation of same whereby torque converters of the type described may be produced at low cost.

It will be understood that changes may be made in the details of construction, arrangement and operation without departing from the spirit of the invention, especially as defined in the following claims.

I claim:
1. A torque converter comprising the combination of:
   (a) a drive rotor including a hub, an outer blade support fixed to the hub shaped to correspond substantially to a semi-torus, and blades between the hub and support with the inner ends located on an imaginary semi-torus;
   (b) a driven rotor including a hub, an inner support shaped to correspond substantially to a semi-torus and blades fixed between the hub and inner support with the outer ends located on a semi-torus, the blades of the drive rotor and the blades of the driven rotor defining an open space therebetween;
   (c) a reactor including a hub, an outer cylindrical support conforming substantially to the semi-torus of the inner ends of the blades of the drive rotor and blades fixed between the hub and the outer support of cylindrical shape and extending into the open space between the drive rotor blade and the driven rotor blades; and
   (d) a sealed housing having an inner side in the shape of a semi-torque;
means fastening the housing to the drive rotor and means mounting the reactor for free rotational movement about the shafts of the drive and driven rotors.

2. A torque converter as claimed in claim 1 in which the semi-torus of the housing conforms substantially to the semi-torus of the outer ends of the driven rotor blades.

3. A torque converter as claimed in claim 1 which includes a side plate fastened to the inner support of the driven rotor and which defines the semi-torus of the outer ends of the driven rotor blades.

4. A torque converter as claimed in claim 3 which includes means mechanically fastening the side plate at the level of the hub of the driven rotor.

5. A torque converter as claimed in claim 3 in which the side plate is welded at its inner side to the ends of the blades of the driven rotor.

References Cited

UNITED STATES PATENTS

| | | | |
|---|---|---|---|
| 2,801,521 | 8/1957 | Jandasek | 60—54 |
| 3,180,095 | 4/1965 | Schneider | 60—54 |
| 3,312,061 | 4/1967 | Murphy | 60—54 |

EDGAR W. GEOGHEGAN, Primary Examiner